US007062565B1

(12) United States Patent　　(10) Patent No.:　　US 7,062,565 B1
Ravindranath et al.　　(45) Date of Patent:　　Jun. 13, 2006

(54) SERVICE SELECTION GATEWAY (SSG) ALLOWING ACCESS TO SERVICES OPERATING USING CHANGING SET OF ACCESS ADDRESSES

(75) Inventors: Vinodh Kumar Ravindranath, Bangalore (IN); Peddareddappa Gonichettipalli, Bangalore (IN); Amit S. Phadnis, Bangalore (IN)

(73) Assignee: Cisco Technology, Inc, San Jose, CA (US)

( * ) Notice: Subject to any disclaimer, the term of this patent is extended or adjusted under 35 U.S.C. 154(b) by 844 days.

(21) Appl. No.: 10/086,346

(22) Filed: Mar. 4, 2002

(51) Int. Cl.
    *G06F 15/16* (2006.01)
(52) U.S. Cl. ............... 709/229; 370/431; 370/389; 713/153
(58) Field of Classification Search ........... 709/217, 709/218, 219, 229; 370/431, 432, 352, 351, 370/229, 383, 389; 713/153, 160
    See application file for complete search history.

(56) References Cited

U.S. PATENT DOCUMENTS

| 5,210,869 | A | * | 5/1993 | Williams ............... 714/48 |
| 5,261,052 | A | * | 11/1993 | Shimamoto et al. ....... 709/206 |
| 5,493,614 | A | * | 2/1996 | Chaum ................. 380/30 |
| 5,518,122 | A | * | 5/1996 | Tilles et al. ............ 209/539 |
| 5,878,230 | A | * | 3/1999 | Weber et al. ........... 709/238 |
| 6,151,316 | A | * | 11/2000 | Crayford et al. ........ 370/356 |
| 6,405,243 | B1 | * | 6/2002 | Nielsen .............. 709/206 |
| 6,427,174 | B1 | * | 7/2002 | Sitaraman et al. ....... 709/245 |
| 6,438,583 | B1 | * | 8/2002 | McDowell et al. ...... 709/206 |
| 6,564,264 | B1 | * | 5/2003 | Creswell et al. ........ 709/245 |

OTHER PUBLICATIONS

Entitled: "Data Sheet: Cisco Service Selection Gateway", Published on: Oct. 7 21:07:17 PDT 2001; Available at: http://www.cisco.com/warp/public/cc/pd/as/6400/prodlit/ssgw_ds.htm ( pp. 3).
Entitled: "Cisco Subscriber Edge Services Manager"; Published on: Dec. 14 14:18:38 PST 2001; Available at: http://www.cisco.com/warp/public/cc/pd/as/6400/prodlit/esvmn_ov.htm (pp. 9).
Entitled: "Node Route Processor—Service Selection Gateway Enhancements II"; Published on: Mar. 26 14:56:36 PST 2000; Available at: http://www.cisco.com/univercd/cc/td/doc/product/software/ios122/122newft/122limit/122b/122b_4/122b4_sg (pp. 17).
Entitled: "Service Selection Gateway"; Published on: Feb. 25 21:23:17 PST 2002;Available at: http://www.cisco.com/univercd/cc/td/doc/product/dsl_prod/6400/feat_gd/12_2_2/fg2_ssg.htm (pp. 82).
Rigney, et. al.; Entitled, "Request for Comments: 2865-Remote Authentication Dial In User Service (RADIUS)"; Jun. 2000; Available from www.ieft.org (76 Pages).

* cited by examiner

*Primary Examiner*—Krisna Lim
(74) *Attorney, Agent, or Firm*—Narendra R. Thappeta (57) ABSTRACT

A service selection gateway (SSG) which allows a subscriber to access services operating using a changing set of access addresses. The SSG may be initially configured to forward packets related to a set of addresses associated with a service. The SSG may then accept a request to a change the set of addresses. In response to the request, the SSG may be configured to forward packets related to the changed set of addresses.

33 Claims, 4 Drawing Sheets

SERVICE SELECTION GATEWAY (SSG) ALLOWING ACCESS TO SERVICES OPERATING USING CHANGING SET OF ACCESS ADDRESSES

BACKGROUND OF THE INVENTION

1. Field of the Invention

The present invention relates to service selection gateways (SSG) used in telecommunication networks, and more specifically to an SSG which allows access to services which are provided using a set of addresses, which can change dynamically.

2. Related Art

Service selection gateways (SSG) generally refer to network switches which allow a subscriber to selectively access various services on the Internet. In one common scenario, a service provider (e.g., an internet service provider or a shop providing the subscriber terminals to access the services) may specify the services a subscriber is permitted to access, and charge (receive compensation) the subscriber for accessing/using the services.

Typically, control of access to services is performed by allowing only packets with specific content. For example, an SSG implemented based on IP routing technology may be configured to forward only packets having headers with pre-specified source/destination addresses (set of addresses) and port numbers.

In general, it is desirable to provide various capabilities in an SSG in relation to providing access to different types of services such that a service provider can offer different services to different subscribers, and charge for the services.

SUMMARY OF THE INVENTION

A service selection gateway (SSG) in accordance with an aspect of the present invention allows a subscriber to access services which operate with a set of addresses which can change over time. Thus, an SSG may first receive a first set of access addresses associated with a service and forward packets destined to the first set of access addresses such that said subscriber can access the service.

The SSG may then receive a request to change the first set of access addresses to a new set of access addresses. In response, the SSG may forward packets destined to the new set of access addresses. Thus, the SSG allows a subscriber to access services operating using a changing set of access addresses.

An embodiment of the SSG maintains service information which determines whether each packet will be forwarded or not according to the services a corresponding subscriber is permitted to access. The service information contains the first set of access addresses in response to receiving the first set of access addresses, and the new set of access addresses in response to said receiving a request to change.

The request to change may specify actions such as addition, deletion and/or replacement of address(es). In an example scenario, the request to change comprises a request to add a new address to the first set of addresses. The new address could be that of a single end-system or an entire (sub) network.

Embodiments may be implemented in the form of a combination of one or more of hardware, software and firmware.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

A service selection gateway (SSG) according to an aspect of the present invention allows a subscriber to access services which may be based on a set ("one or more") of addresses which can change over time. Such a feature may be attained by designing the SSG to be able to accept a change to a set of addresses which are used to provide a service. Access to different types of applications may be provided by an SSG using the feature.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
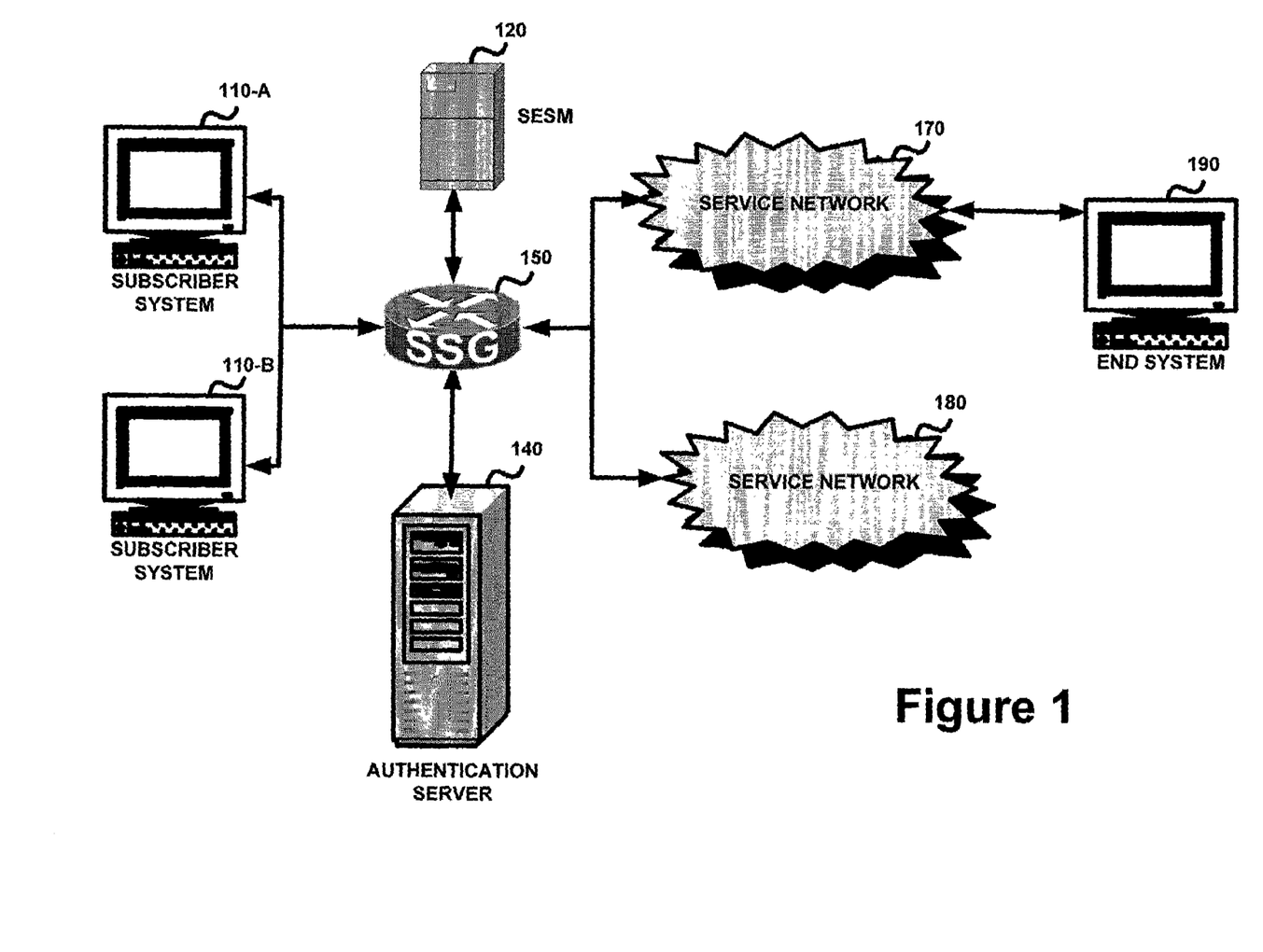
FIG. 1 is a block diagram illustrating an example environment in which the present invention can be implemented.

FIG. 1 is a block diagram illustrating an example environment in which the present invention can be implemented. The environment is shown containing subscriber systems 110A and 110B (both individually or combined referred by numeral 110 as will be clear from the context), subscriber edge service manager (SESM) 120, authentication server 140, service selection gateway (SSG) 150, service networks 170 and 180, and end system 190. Each system is described in further detail below.

Subscriber system 110 generally refers to a user system such as a personal computer (PC) using which a subscriber accesses services provided using servers in service networks 170 and 180. The manner in which a subscriber (or even a service provider) can select the desired/allowed services for the subscriber, and the manner in which the subscriber can then use one or more of the desired services is described below.

Service networks 170 and 180 typically contain many servers (not shown) such as web servers and network devices (e.g., routers), which provide different services (e.g., Net Meeting or games between different subscribers). The manner in which SSG 150 may enable the introduction of several new types of services is described below.

SESM 120 provides an interface for a subscriber to send any necessary information (e.g., user identifier and password) for authenticating the subscriber. The provided information is sent to authentication server 140, which authenticates the subscriber. Authentication server 140 may be implemented based on RFC-2865, entitled, "Remote Authentication Dial In User Service (RADIUS)", available from www.ietf.org, and is incorporated in its entirety herewith.

An authentication confirmation message from authentication server 140 may further indicate a list of available services the subscriber is allowed to access. SESM 120 may then enable the subscriber to select the desired services of interest by a suitable interface, for example, by sending a HTML page to a web browser executing on subscriber system 110.

SESM 120 may then cause SSG 150 to be configured to forward packets related to the permitted (potentially the same as the desired) services only for the specified subscriber system. The configuration may specify the specific packets to be forwarded in both directions. In general, the configuration specifies a set of network address (typically of the servers, or network addresses containing the server addresses) along with other parameters (e.g., port numbers, etc.).

In a prior embodiment, the set of network addresses associated with a service in SSG 150 may remain the same. Such a static approach may not lend to support of services which operate using a changing set of network addresses as described below.

3. Problem

One problem with SSGs which do not allow a set of addresses associated with each service to be changed, is illustrated with reference to net-meeting service (offered for example, by Microsoft Corporation), in which multiple parties can be part of a session. For illustration, it is assumed that service network 170 facilitates a net-meeting service among potentially many user systems, and a subscriber (or subscriber system 110) may be permitted to access service network 170 (i.e., the servers providing the service).

Assume further that both subscriber system 110 and end system 190 wish to be parties to a teleconference session at given time. Typically, the communication between the two systems would need to be enabled after the two systems are logged into a server in service network 170. At least to prevent the server from being a bottleneck, it may be desirable to set up a direct connection between subscriber system 110 and end system 190 during the teleconference session.

Unfortunately, SSG 150 may not permit such a direct connection as the set of addresses permitted access from subscriber system 110 may not contain the address of end system 190. The manner in which an aspect of the present invention allows such access, potentially in a seamless manner is described below.

4. Method

Figure 2:
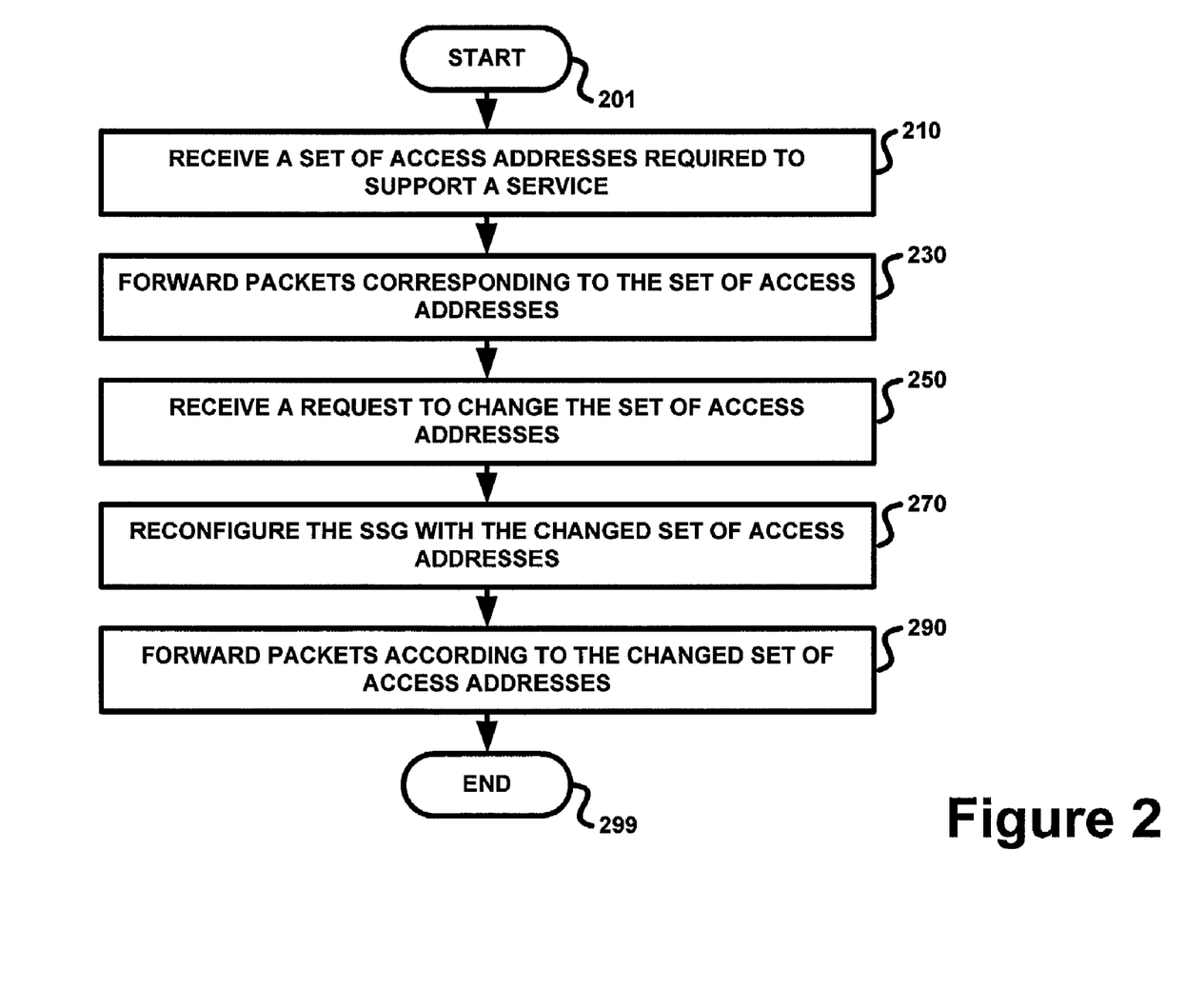
FIG. 2 is a flow chart illustrating a method in accordance with the present invention.

FIG. 2 is a flow-chart illustrating a method using which an SSG may enable a subscriber to access services which operate using a changing set of access addresses. The flow-chart is described with reference to the systems of FIG. 1 and the net-meeting application noted above for illustration. The invention can be implemented in other environments as well. The method begins in step 201, in which control immediately passes to step 210.

In step 210, SSG 150 receives a set of access addresses required to support a service. In the net-meeting example of above, SSG may receive the address of server (or potentially a network address and mask indicating the servers providing the service) in service network 170, which facilitate the net-meeting service.

In step 230, SSG 130 forwards packets corresponding to the set of network addresses received in step 110. The forwarding policies in SSG 130 may be configured to forward packets with the set of network addresses. Such configuration may be performed in a known way.

In step 250, SSG 150 receives a request to change the set of network addresses as may be required to support the service. The packets received for supporting steps 210 and 250 may be implemented according to any pre-specified protocol. With respect to the net-meeting example of above, SSG 150 may receive a request to add the address of end system 190 such that communication is permitted between subscriber system 110 and end system 190 at least with respect to the net-meeting service.

In step 270, SSG 150 is reconfigured with the changed (new) set of network addresses associated with the service. In the net-meeting example of above, the forwarding policies are modified to permit the corresponding packets between end system 190 and subscriber system 110. Accordingly, SSG 150 forwards packets according to the changed set of network addresses in step 290.

Thus, using an approach according to the description of above, a service selection gateway (SSG) may allow access to services with changing set of access addresses. An example embodiment of SSG is described in further detail below.

5. Service Selection Gateway

Figure 3:
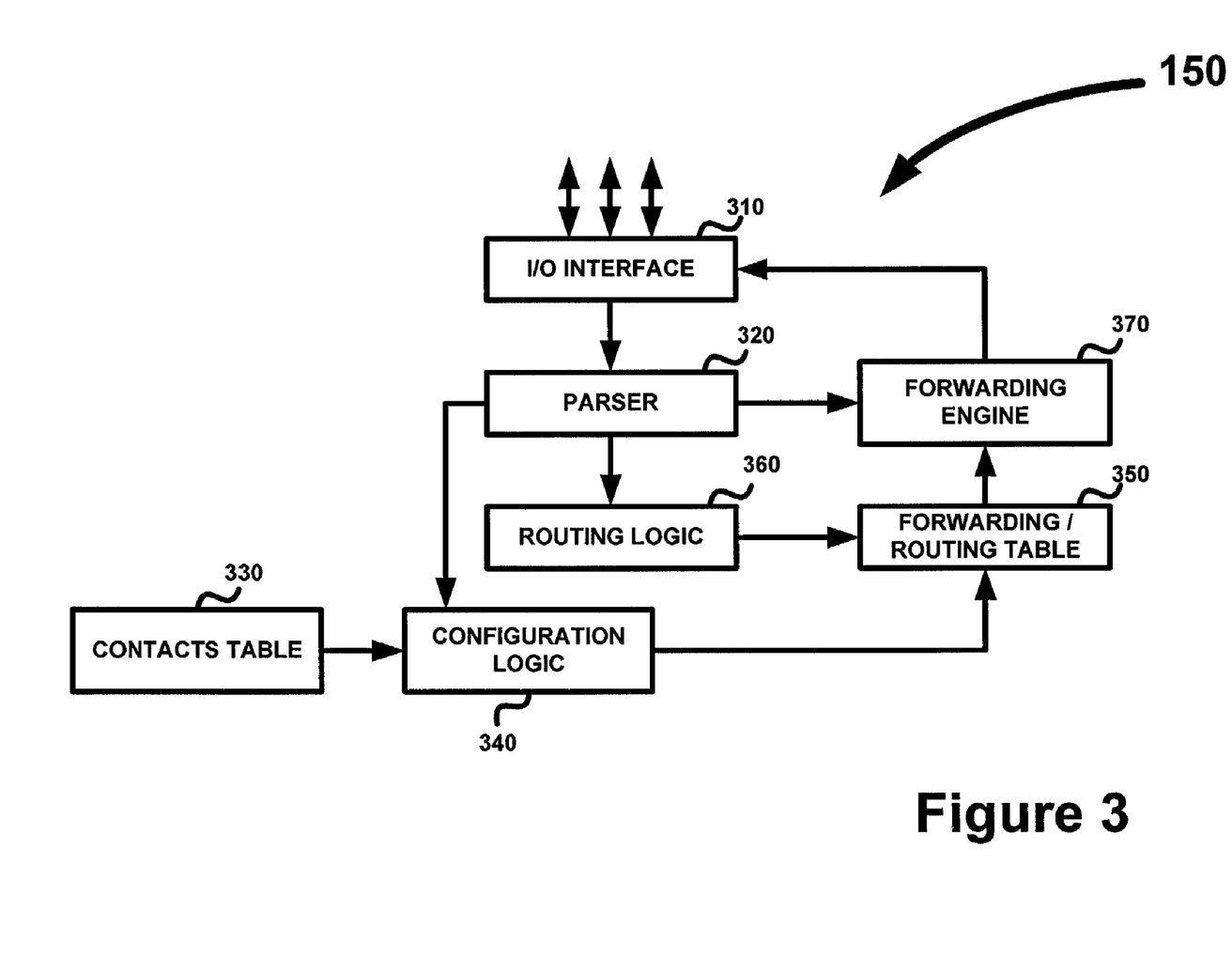
FIG. 3 is a block diagram illustrating the internals of an embodiment of a service selection gateway (SSG) provided in accordance with the present invention.

FIG. 3 is a block diagram illustrating the details of an embodiment of service selection gateway (SSG) 150 in accordance with an aspect of the present invention. SSG 150 is shown containing I/O interface 310, parser 320, configuration logic 340, forwarding/routing table 350, routing logic 360, and forwarding engine 370. Each component is described in further detail below.

I/O interface 310 provides the physical, electrical and other protocol interfaces necessary for IP packets to be sent to and received from the other systems, i.e., subscriber system 110, service networks 170 and 180, authentication server 140, and SESM 120. The received packets are forwarded to parser 320 for further processing. I/O interface 310 may contain several physical ports which can be used to send packets on different paths. I/O interface 310 may be implemented in a known way.

Parser 320 examines each received packet to determine whether to forward the contained data (or the entire packet) to configuration logic 340, routing logic 360 or forwarding engine 370. Data related to change of service information for each specific subscriber is forwarded to configuration logic 340. Routing related data may be sent to routing logic 360. IP packets requiring forwarding are sent to forwarding engine 370.

In one embodiment, parser 320 receives from SESM 120 service information reflecting the permitted services, and a next hop (routing information) for each service. Parser 320 forwards the service information to configuration logic 340 and the next hop information to routing logic 360. Alternatively, configuration logic 340 may be integrated with routing logic 360 as one component.

Forwarding/routing table 350 stores the routing and service information necessary to process the packets which need to be forwarded to a next hop. In general, routing information indicates the path in which the packet is to be forwarded, and the service information indicates whether to forward (or block) a packet according to the services the corresponding subscriber is permitted to access. The service information and routing information may be stored in the form of a single table or separate multiple tables as felt necessary by a designer consistent with the implementation of other components.

Routing logic 360 processes the routing information received from parser 310. The routing information is stored in forwarding/routing table 350. Routing logic 360 may be implemented in a known way.

Configuration logic 340 receives packets representing a set of access addresses a subscriber is permitted to access, and sets the service information in forwarding/routing table 350 accordingly. In addition, configuration logic 340 may receive packets representing a change in the set of the access addresses. Configuration logic 340 modifies the set of access addresses according to the change(s).

The initial list of addresses associated with a service and then changes thereto may be received according to any pre-specified convention. The changes can be specified in the form of an individual address or a group of addresses. The group of addresses may in turn be specified using network address potentially along with a network mask.

While the above examples are described with reference to addition of the address of end system 190, it should be understood that other types of changes may be performed as required by the specific application. For example, the same address may need to be deleted from the set of addresses once the meeting between the users on subscriber system 110 and end system 190 ends. In addition, a change may specify the replacement with an entirely new group of addresses.

In general, it is desirable to limit the systems which can specify changes to the set of access addresses associated with a service. Accordingly, contacts table 370 indicating the systems which are permitted to change the set of addresses for each service, may be maintained. In the case of net meeting service noted above, a remote SSG (if) serving end system 190 and/or servers (which facilitate the meeting) in service network 170 may be indicated as being permitted to change the set of addresses.

Thus, either the remote SSG or service network may indicate the addition of end system 190 to the set of addresses. Accordingly, configuration logic 340 may accept changes from only systems indicated in contacts table 370.

Forwarding engine 370 determines the manner in which each packet received from parser 320 is to be processed. The routing information may be used to determine the specific port of I/O interface 310 on which to forward the packet. The service information may be used to determine whether to forward the packet. Forwarding engine may need to determine the specific subscriber and service to which a received packet relates to, and process the packet according to the service information related to the subscriber/service. Forwarding/routing table 350 may be examined for the routing and service information.

As the set of addresses in service information associated with a service can be changed dynamically, SSG 150 may allow access to services with a changing set of access addresses. It should be understood that the different components of an SSG can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing SSG 150 with a desired mix of hardware, software and/or firmware. An embodiment implemented substantially in software is described below.

6. Software Implementation

Figure 4:
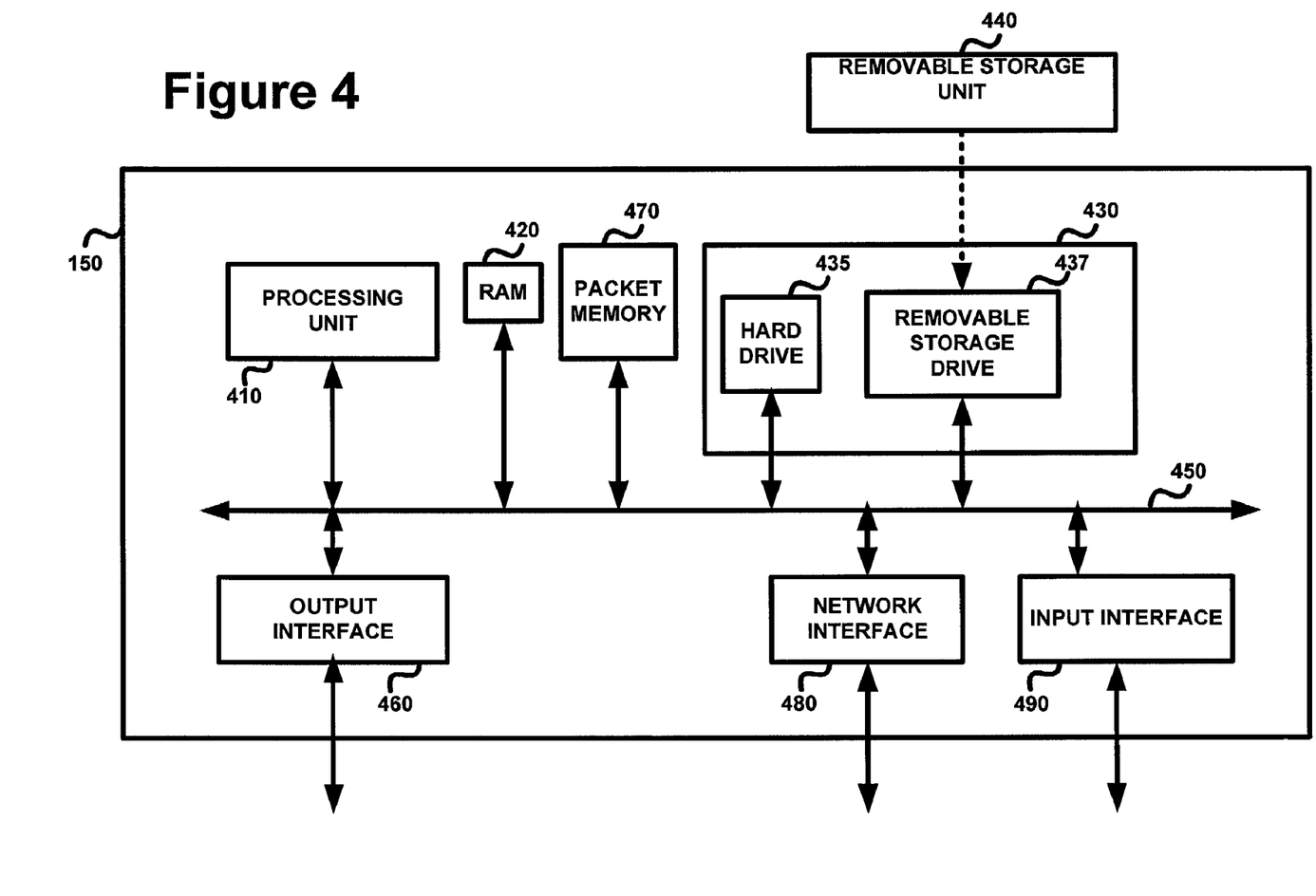
FIG. 4 is a block diagram illustrating the details of an embodiment of an service selection gateway implemented substantially in the form of software according to an aspect of the present invention.

FIG. 4 is a block diagram illustrating the details of SSG 150 in one embodiment. SSG 150 is shown containing processing unit 410, random access memory (RAM) 420, storage 430, output interface 460, packet memory 470, network interface 480 and input interface 490. Each component is described in further detail below.

Output interface 460 provides output signals (e.g., display signals to a display unit, not shown) which can form the basis for a suitable subscriber interface for an administrator (configuring SSG 150) to interact with SSG 150. Input interface 490 (e.g., interface with a key-board and/or mouse, not shown) enables a user/administrator to provide any necessary inputs to SSG 150.

For example, using input interface 490 and output interface 460, a user may specify the systems which can indicate changes to access addresses (stored in contacts table 370). Similarly, a user may specify the specific services, with which the feature of change of set of addresses may be enabled.

Network interface 480 may enable SSG 150 to send and receive data on communication networks internet protocol (IP). Network interface 480, output interface 460 and input interface 490 can be implemented in a known way.

RAM 420, storage 430, and packet memory 470 may together be referred to as a memory. RAM 420 receives instructions and data on path 450 from storage 430, and provides the instructions to processing unit 410 for execution. Packet memory 470 stores (queues) packets waiting to be forwarded (or otherwise processed) on different ports.

Secondary memory 430 may contain units such as hard drive 435 and removable storage drive 437. Secondary storage 430 may store the software instructions and data, which enable SSG 150 to provide several features in accordance with the present invention.

Some or all of the data and instructions may be provided on removable storage unit 440 (or from a network using protocols such as Internet Protocol), and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420.

In general processing unit 410 reads sequences of instructions from various types of memory medium (including RAM 420, storage 430 and removable storage unit 440), and executes the instructions to provide various features of the present invention. The service information related to each subscriber may be maintained in the form of data structures. Example data structures are described below.

7. Service Information

In an embodiment, when the authentication of a subscriber is completed, a host object data structure is created for the subscriber. Similarly, a service object may be created associated with each of the services provided through SSG. Thus, SSG 150 may store a number of service objects equal to all the services accessed by the subscribers at a given time.

Connection objects may be used to specify the specific services each subscriber is permitted to access. Thus, if a subscriber is permitted to access five services, five connection objects may be used to connect the host object of the subscriber to the corresponding five service objects. The connection object may store information such as usage statistics (time service used or packets transmitted/received).

Each service object may contain the set of access addresses using which the service may be accessed. Thus, the instructions executed by processing unit 410 may cause the initial set of addresses associated with a service to be stored in the corresponding service object data structure. When a request to change the set of addresses is received, the instructions may cause the changed set of addresses to be stored in the service object. In case of addition of an address, the address may simply be added without affecting the prior addresses.

While forwarding packets, the instructions executed by processing unit 410 may cause packets to identify each received packet to be identified with a subscriber. In an embodiment, the subscriber is identified by examining the source IP address (in case of packet being transmitted to service network 170). If the corresponding host object does not yet exist, the packet may be dropped. However, all packets to a network containing SESM 120 may be forwarded to enable a subscriber to set up the services and the corresponding host objects to be created.

In addition, the packets from a subscriber to a service network may be forwarded only if the destination address (of the server in service network 170) is present in a service object for the service. As the set of addresses can be changed and stored in the service object, a service selection gateway may allow access to services operating using a changing set of access addresses.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of allowing a subscriber to access a service, said method being performed in a service selection gateway (SSG), said method comprising:

receiving a first set of access addresses, wherein said first set of access addresses represent the set of addresses at which said service can be accessed;

forwarding a first plurality of packets, each of said first plurality of packets is destined to one of said first set of access addresses such that said subscriber can access said service;

receiving a request to change said first set of access addresses to a new set of access addresses, wherein said new set of access addresses represent addresses at which said service can be continued to be accessed; and forwarding a second plurality of packets, each of said second plurality of packets being destined to one of said new set of access addresses such that said subscriber can continue to access said service.

2. The method of claim 1, further comprising maintaining a service information which determines whether each packet in said first plurality of packets and second plurality of packets is forwarded or not, wherein said service information comprises said first set of access addresses in response to said receiving a first set of access addresses, and said service information comprises said new set of access addresses in response to said receiving a request to change.

3. The method of claim 2, wherein said request to change comprises a request to add a new address to said first set of addresses.

4. The method of claim 3, wherein a subscriber system used by said subscriber communicates directly with a user system having said new address when said service information comprises said new set of access addresses.

5. The method of claim 4, wherein said maintaining comprises storing in a service object the addresses of a set of servers said subscriber system is permitted to access.

6. The method of claim 3, further comprising:

receiving another request specifying deletion of said new address; and removing said new address from said new set of access addresses such that said service information contains only said first set of access addresses.

7. The method of claim 3, further comprising:

maintaining a contacts information specifying a set of contacts permitted to change addresses associated with each service; and examining said contact information to determine whether said request to change is received from a system permitted to change said first set of access addresses.

8. The method of claim 3, wherein said first set of access addresses correspond to address of servers which provide said service, and wherein said request is received from one of said servers.

9. The method of claim 8, wherein said new address comprises an address of another system which also needs to be accessed as a part of said service.

10. The method of claim 9, wherein said service comprises net meeting and said another system corresponds to another user system which is part of said net meeting service.

11. A service selection gateway (SSG) allowing a subscriber to access a service, said SSG comprising:

means for receiving a first set of access addresses, wherein said first set of access addresses represent the set of addresses at which said service can be accessed;

means for forwarding a first plurality of packets, each of said first plurality of packets is destined to one of said first set of access addresses such that said subscriber can access said service;

means for receiving a request to change said first set of access addresses to a new set of access addresses, wherein said new set of access addresses represent addresses at which said service can be continued to be accessed; and means for forwarding a second plurality of packets, each of said second plurality of packets being destined to one of said new set of access addresses such that said subscriber can continue to access said service.

12. The service selection gateway of claim 11, further comprising means for maintaining a service information which determines whether each packet in said first plurality of packets and second plurality of packets is forwarded or not, wherein said service information comprises said first set of access addresses upon receiving said first set of access addresses, and said service information comprises said new set of access addresses upon receiving said request to change.

13. The service selection gateway of claim 12, wherein said request to change comprises a request to add a new address to said first set of addresses.

14. The service selection gateway of claim 13, wherein a subscriber system used by said subscriber communicates directly with a user system having said new address when said service information comprises said new set of access addresses.

15. The service selection gateway of claim 14, wherein said means for maintaining comprises means for storing in a service object the addresses of a set of servers said subscriber system is permitted to access.

16. The service selection gateway of claim 13, further comprising:
means for receiving another request specifying deletion of said new address; and means for removing said new address from said new set of access addresses such that said service information contains only said first set of access addresses.

17. The service selection gateway of claim 13, further comprising:
means for maintaining a contacts information specifying a set of contacts permitted to change addresses associated with each service; and
means for examining said contact information to determine whether said request to change is received from a system permitted to change said first set of access addresses.

18. The service selection gateway of claim 13, wherein said first set of access addresses correspond to address of servers which provide said service, and wherein said request is received from one of said servers.

19. A computer readable medium carrying one or more sequences of instructions for causing a service selection gateway (SSG) to allow a subscriber to access a service, wherein execution of said one or more sequences of instructions by one or more processors contained in said SSG causes said one or more processors to perform the actions of:
receiving a first set of access addresses, wherein said first set of access addresses represent the set of addresses at which said service can be accessed;
forwarding a first plurality of packets, each of said first plurality of packets is destined to one of said first set of access addresses such that said subscriber can access said service;
receiving a request to change said first set of access addresses to a new set of access addresses, wherein said new set of access addresses represent addresses at which said service can be continued to be accessed; and
forwarding a second plurality of packets, each of said second plurality of packets being destined to one of said new set of access addresses such that said subscriber can continue to access said service.

20. The computer readable medium of claim 19, further comprising maintaining a service information which determines whether each packet in said first plurality of packets and second plurality of packets is forwarded or not, wherein said service information comprises said first set of access addresses in response to said receiving a first set of access addresses, and said service information comprises said new set of access addresses in response to said receiving a request to change.

21. The computer readable medium of claim 20, wherein said request to change comprises a request to add a new address to said first set of addresses.

22. The computer readable medium of claim 21, wherein a subscriber system used by said subscriber communicates directly with a user system having said new address when said service information comprises said new set of access addresses.

23. The computer readable medium of claim 22, wherein said maintaining comprises storing in a service object the addresses of a set of servers said subscriber system is permitted to access.

24. The computer readable medium of claim 23, wherein said maintaining further comprises:
creating a host object when said subscriber is authenticated;
creating a service object for each of a plurality of services; and
using a connection object to map said host object to one of said plurality of services said subscriber is permitted to access.

25. The computer readable medium of claim 21, further comprising:
receiving another request specifying deletion of said new address; and
removing said new address from said new set of access addresses such that said service information contains only said first set of access addresses.

26. The computer readable medium of claim 21, further comprising:
maintaining a contacts information specifying a set of contacts permitted to change addresses associated with each service; and
examining said contact information to determine whether said request to change is received from a system permitted to change said first set of access addresses.

27. The computer readable medium of claim 21, wherein said first set of access addresses correspond to address of servers which provide said service, and wherein said request is received from one of said servers.

28. A service selection gateway (SSG) allowing a subscriber to access a service, said SSG comprising:
a forwarding engine forwarding packets according to a service information;
a memory storing said service information comprising a first set of access addresses representing the set of addresses at which said service can be accessed, such that said subscriber can access said service based on packets forwarded by said forwarding engine;
an input interface receiving a request to change said first set of access addresses to a new set of access addresses, wherein said new set of access addresses represent addresses at which said service can be continued to be accessed; and
a configuration logic changing said service information such that said new set of access addresses are associated with said service, whereby said subscriber uses said service with said new set of access addresses.

29. The SSG of claim 28, further comprising:
a parser receiving a packet and determining whether said packet contains said request or is related to a routing protocol or is to be forwarded, said parser sending said packet to said forwarding engine if said packet is to be forwarded, said parser sending said packet to said configuration logic is said packet contains said request; and a routing logic receiving said packet if said packet is related to said routing protocol, said routing logic configuring a routing table according to said packet.

30. The SSG of claim 28, further comprising a contacts table which indicates a set of contacts permitted to change addresses associated with each service, and wherein said configuration logic examines said contact table to determine whether said request to change is received from a system permitted to change said first set of access addresses.

31. The SSG of claim 28, wherein said request to change comprises a request to add a new address to said first set of addresses.

32. The SSG of claim 31, wherein a subscriber system used by said subscriber communicates directly with a user system having said new address when said service information comprises said new set of access addresses.

33. The SSG of claim 31, wherein said input interface receives another request specifying deletion of said new address, and said configuration logic removes said new address from said new set of access addresses such that said service information contains only said first set of access addresses.

* * * * *